May 6, 1924.
H. F. STROHL
NONSKID DEVICE
Filed March 28, 1923
1,492,763
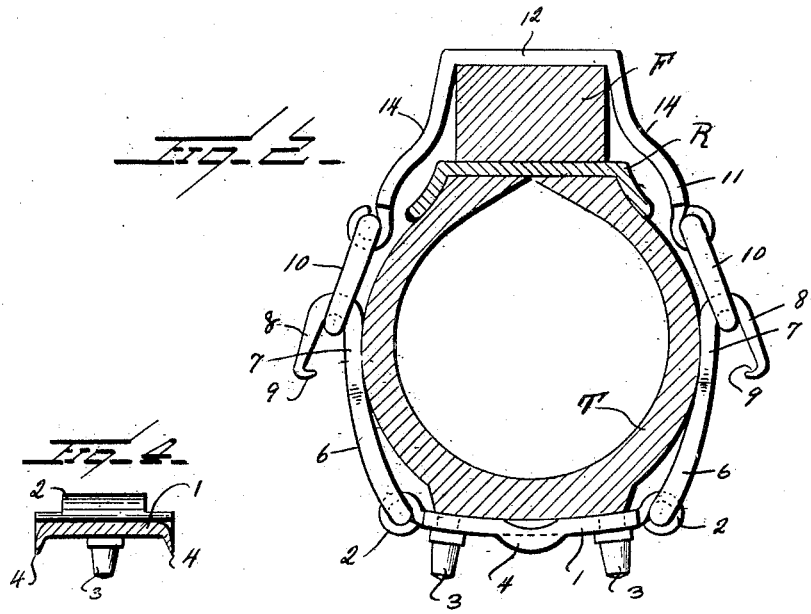
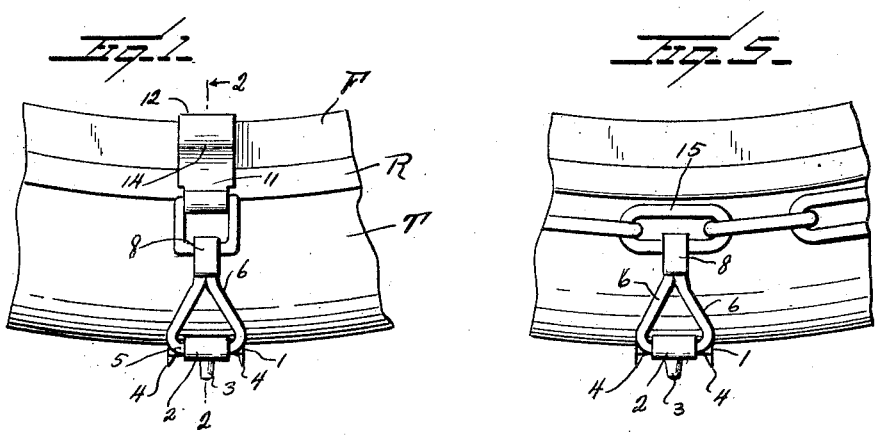
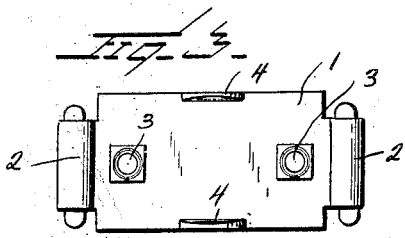
INVENTOR.
H. F. Strohl
BY Watson E. Coleman
ATTORNEY.

Patented May 6, 1924.

1,492,763

UNITED STATES PATENT OFFICE.

HERBERT F. STROHL, OF NESQUEHONING, PENNSYLVANIA.

NONSKID DEVICE.

Application filed March 28, 1923. Serial No. 628,285.

*To all whom it may concern:*

Be it known that I, HERBERT F. STROHL, a citizen of the United States, residing at Nesquehoning, in the county of Carbon and State of Pennsylvania, have invented certain new and useful Improvements in Nonskid Devices, of which the following is a specification, reference being had to the accompanying drawings.

This invention relates to certain improvements in non-skid devices and it is an object of the invention to provide a novel and improved device of this general character which can be readily and conveniently applied to a wheel and which, when applied, serves to effectually prevent side skidding and slipping.

It is also an object of the invention to provide a novel and improved device of this general character which comprises a tread member or plate having pivotally or hingedly connected at the extremities thereof hook members, said hook members being so formed to prevent separation of the hook members from the plate upon deflation of the tire.

The invention consists in the details of construction and in the combination and arrangement of the several parts of my improved non-skid device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary elevational view illustrating a non-skid device constructed in accordance with an embodiment of my invention and in applied position;

Figure 2 is an enlarged view partly in section and partly in elevation, the line of section being taken substantially on the line 2—2 of Figure 1, looking in the direction of the arrow;

Figure 3 is a view in top plan of a tread member unapplied;

Figure 4 is a transverse sectional view taken through Figure 3;

Figure 5 is a fragmentary elevational view illustrating a further embodiment of my invention;

As disclosed in the accompanying drawings, T denotes a tire mounted in a conventional manner upon a rim R arranged upon a felly F.

My improved non-skid device comprises a tread member or plate 1 which, when applied, extends transversely of the tread of the tire T, said member or plate 1 at its opposite ends is provided with the sleeves or barrels 2 extending transversely of the member or plate 1.

The sleeves or barrels 2 are each of a length less than the width of the member or plate 1 and is positioned substantially centrally thereof. Suitably engaged with the opposite end portions of the member or plate 1 and at the transverse center thereof are the outstanding calks 3 of any ordinary or preferred type.

The side marginal portions of the member or plate 1 are provided with the centrally arranged and outstanding flanges 4 disposed in the same general direction as the calks 3.

Freely disposed through each of the sleeves or barrels 2 is the bar 5 having its extremities continued by the outwardly converging arms 6, the converging extremities of the arms 6 being continued by the shank of a hook member 7. The bill 8 of the hook member 7 is disposed in a general direction toward the plate or member 1 and terminates in an inwardly directed lip or flange 9. As is clearly illustrated in Figure 2 of the accompanying drawings, the arms 6 and the shank of the hook member 7 are arranged on such a curvature to overlie the side walls of the tire T and have close contact therewith. The hook member 7 when in applied position contacts with a side of the tire T so that upon deflation of the tire the hook member 8 will be forced outwardly. This is of particular advantage because it is assured that under all conditions the hook member 8 will be maintained in operative engagement with the holding means associated therewith.

As particularly illustrated in Figures 1 and 2 each of the hook members 8 is adapted to be engaged with a link 10 hinged or swinging in connection with the extremity of a plate 11. The plate 11 is of such formation as to have its intermediate portion 12 in contact with the inner face of the felly F and to provide the side arms 14 extending toward the applied tire T and preferably terminating outwardly of the rim R. The links 10 provide means whereby the outward movement of the hook members 8 are assured in the event of deflation of the tire T.

In the embodiment of my invention as is particularly illustrated in Figure 5 the structure of the device is the same as hereinbefore described with the exception that each of the hook members 7 is adapted to be directly engaged with a link 15 of a side chain.

In practice any preferred number of the devices are adapted to be applied to a wheel and with such devices in applied position slipping and side skidding is effectively prevented and especially when the brakes are suddenly applied, irrespective of the icy or muddy condition of the roadway or whether on a level or on a hill. My improved device when applied also materially aids in climbing out of deep ruts or in plowing through deep snow.

The particular feature of the device is the fact that the same cannot become lost upon deflation of the tire because upon deflation the hooks 7 will be forced outwardly whereby disengagement from the links 10 or 15 is prevented. It is also believed to be obvious that my improved device may be easily and quickly attached.

From the foregoing description it is thought to be obvious that a non-skid device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A non-skid device comprising, in combination, a plate adapted to extend across and have close contact with the inner face of the felly of a wheel, the extremities of the plate being provided with outstanding arms, said arms being of a length to terminate outwardly of the rim of the wheel, a tread plate, hook members pivotally engaged with the extremities of the tread plate, the bills of the hook members being provided with inwardly directed lips, and links hingedly connected with the arms of the first named plate and engageable with the hook members.

2. A non-skid device comprising, in combination, a plate adapted to extend across and have close contact with the inner face of the felly of a wheel, the extremities of the plate being provided with outstanding arms, said arms being of a length to terminate outwardly of the rim of the wheel, a tread plate, hook members pivotally engaged with the extremities of the tread plate, and links hingedly connected with the arms of the first named plate and engageable with the hook members.

In testimony whereof I hereunto affix my signature.

HERBERT F. STROHL.